United States Patent [19]

Wagner

[11] 4,231,508

[45] Nov. 4, 1980

[54] METHOD OF MAKING A PLATE-TYPE HEAT EXCHANGER

[75] Inventor: Norbert Wagner, Schlederloh, Fed. Rep. of Germany

[73] Assignee: Linde AG, Wiesbaden, Fed. Rep. of Germany

[21] Appl. No.: 963,289

[22] Filed: Nov. 24, 1978

Related U.S. Application Data

[63] Continuation of Ser. No. 778,460, Mar. 17, 1977, Pat. No. 4,140,266.

[30] Foreign Application Priority Data

Mar. 19, 1976 [DE] Fed. Rep. of Germany ....... 2611832

[51] Int. Cl.$^{3}$ ........................................ B23K 1/00

[52] U.S. Cl. .................................... 228/219; 228/232; 228/242; 228/183

[58] Field of Search ............... 228/219, 221, 220, 232, 228/230, 242, 183

[56] References Cited

U.S. PATENT DOCUMENTS

| | | | |
|---|---|---|---|
| 779,886 | 1/1905 | Stewart | 228/242 |
| 2,816,355 | 12/1957 | Herman | 228/219 |
| 2,944,504 | 7/1960 | Herman et al. | 228/219 |
| 3,062,948 | 11/1962 | Arnoldy | 228/219 |
| 3,168,782 | 2/1965 | Cochran | 228/219 |
| 3,375,570 | 4/1968 | Dubusker et al. | 228/183 |
| 3,378,914 | 4/1968 | Miller | 228/219 |
| 3,412,457 | 11/1968 | Gregory | 228/232 |
| 3,882,596 | 5/1975 | Kendziora et al. | 228/232 |
| 4,157,155 | 6/1979 | Smith | 228/242 |

*Primary Examiner*—Daniel C. Crane
*Attorney, Agent, or Firm*—Karl F. Ross

[57] ABSTRACT

Plates of a plate heat exchanger, defining between them a space adapted to be traversed by a heat-exchange fluid, are held together and are soldered in a chamber in which the plates are heated by passing a heating fluid, generally an inert gas, directly through the passages between the plates.

9 Claims, 1 Drawing Figure

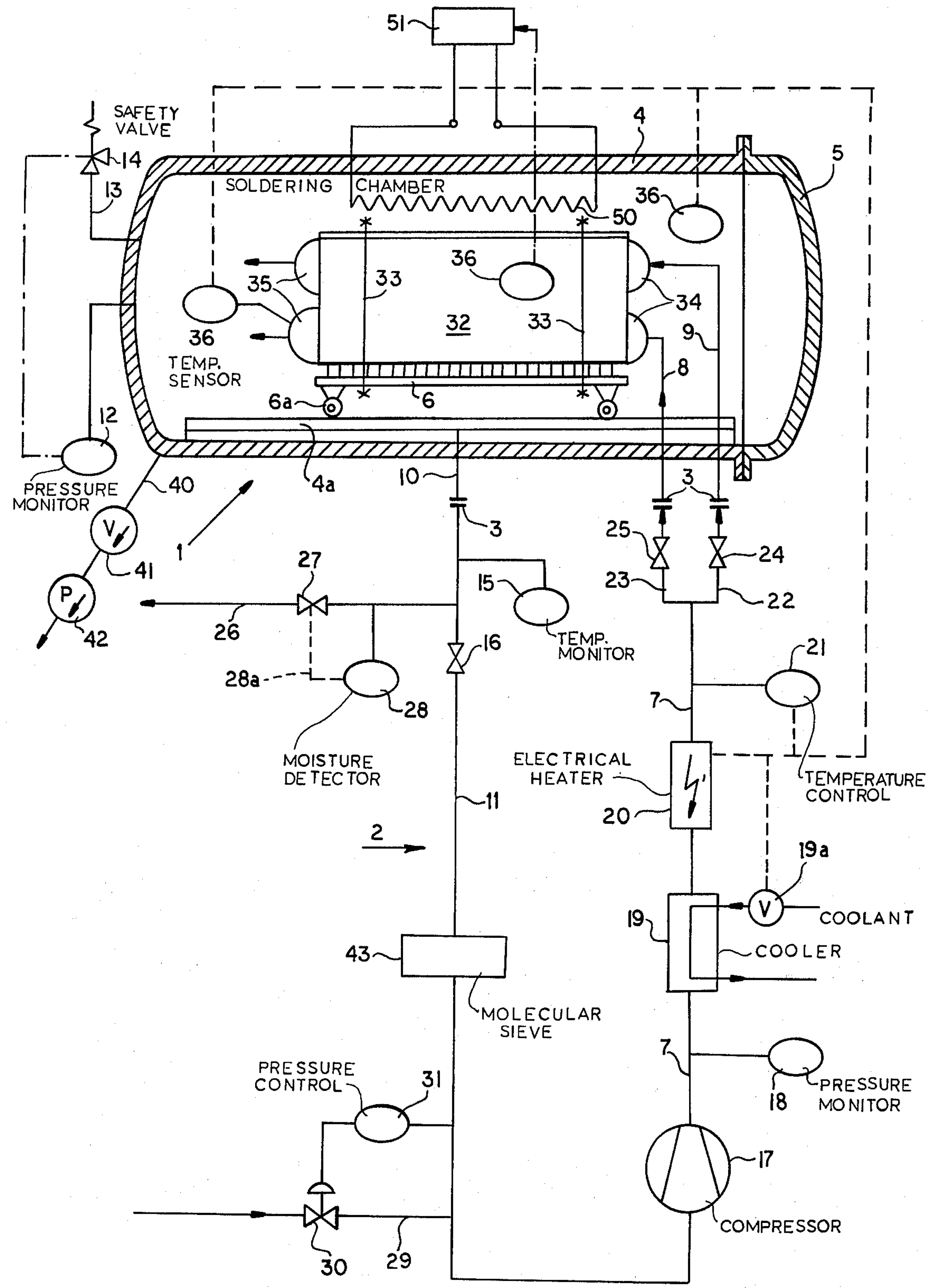
51
SAFETY VALVE
14
13
4
5
SOLDERING CHAMBER
50
36
33
35
34
32
9
TEMP. SENSOR
8
6a
6
12
PRESSURE MONITOR
40
4a
10
3
1
25
24
23
22
41
42
27
15
TEMP. MONITOR
26
16
28a
28
MOISTURE DETECTOR
21
7
ELECTRICAL HEATER
TEMPERATURE CONTROL
20
11
2
19a
COOLANT
19
COOLER
43
MOLECULAR SIEVE
PRESSURE CONTROL
31
18
PRESSURE MONITOR
17
COMPRESSOR
30
29

METHOD OF MAKING A PLATE-TYPE HEAT EXCHANGER

CROSS REFERENCE TO RELATED APPLICATION

This application is a continuation-in-part of Ser. No. 778,460 filed March 17, 1977, now U.S. Pat. No. 4,140,266 issued Feb. 20, 1979.

FIELD OF THE INVENTION

The present invention relates to a method of soldering workpieces defining a space between them. More particularly, the invention relates to improvements in the soldering together of the plates of a plate heat exchanger and, in the most general terms, to a method of making a heat exchanger.

BACKGROUND OF THE INVENTION

In the production of heat exchangers with plate-like elements, e.g. in the production of so-called plate heat exchangers, a stack of plates can be assembled together and soldered at their points or zones of mutual contact, generally in a furnace, oven or like chamber provided with heating means. The solder can be provided with heating means. The solder can be provided upon the contacting edges or surfaces previously and, when the plates are brought to the soldering temperature, the solder is caused to flow to bond the adjacent plates together.

A furnace for this purpose has been provided heretofore (see, for example, German open application DT-OS No. 22 54 769) and can comprise electrical heating rods or other heating elements disposed in the interior of the furnace through which a protective gas is circulated by a blower. The stack of plates to be soldered together is introduced into the furnace chamber and generally must be preheated so that the soldering temperature can be generated quickly and as uniformly as possible within the chamber. Reference may also be had to U.S. Pat. Nos. 2,293,996, 2,389,175, 2,282,226, 2,944,504, 3,517,916, 3,816,901 and 3,756,489.

This system, wherein the circulating gas only passes around the stack, has been found to have disadvantages and to require considerable work on the part of operating personnel in that, not only must the workpieces be preheated in a separate step, but the preheated pieces must be assembled together and/or the assembled stack subjected to careful preheating.

In spite of these procedures, it has been found that the heating of the plates is not uniform within the chamber and hence certain portions may not reach the soldering temperature while other portions may be overheated. In other words a uniform heat distribution within the workpiece stack at the soldering temperature can be attained only with difficulty in the conventional arrangement.

OBJECTS OF THE INVENTION

It is the principal object of the present invention to provide an improved method of or process for the soldering of generally flat workpieces which define spaces between them.

Another object of the invention is to provide an improved process which affords a rapid and uniform heating of a stack of workpieces in contact with one another.

Still another object is to provide an improved method of soldering of the plates of a plate-type heat exchanger together.

Still another object of this invention is to provide a system for forming a plate-type heat exchanger by soldering whereby the aforementioned disadvantages are obviated.

SUMMARY OF THE INVENTION

These objects and others which will become apparent hereinafter are attained, in accordance with the present invention, in a process in which a plurality, i.e. at least two and generally a multiplicity, of plate-like elements adapted to form a plate-type heat exchanger and defining spaces between them are heated by passing a heating fluid through these spaces, i.e. through the passages which, in the finished heat exchanger, are adapted to be traversed by a heat-exchange fluid. The heating fluid is heated to a temperature sufficient to bring the workpiece stack to the soldering temperature and, most surprisingly, has been found to achieve this result in a highly uniform and rapid manner.

Thus while workpieces defining spaces, i.e. fluid-flow passages, between them cannot be effectively heated rapidly and uniformly by conventional means, the passage of the hot fluid through the spaces has been found to achieve the desired degree of heating in a high-speed and uniform manner.

According to a feature of the invention, the heating of the workpieces is effected within a thermally insulated soldering chamber into which the heating fluid is fed and within which the heating fluid is conducted through the interior of the aforementioned spaces, i.e. through the passages defined between the adjacent plates of the stack.

The heating fluid is preferably circulated through these passages via a blower, compressor or a pump along a recirculation path along which the heating fluid can be temperature controlled, i.e. heated or cooled before it enters the passages or thereafter.

According to still another feature of the invention, the heating fluid is an inert gas and best results have been obtained with nitrogen since the nitrogen permits a flux-less soldering of workpieces of aluminum or aluminum alloys to be carried out. The solder can be applied to the surfaces to be joined previously and, advantageously, the heating fluid traverses the passages at a rate which prevents it from entraining the flowable solder along with this fluid.

Excellent heat transfer from the inert gas to the workpieces can be obtained when the pressure of the heating fluid within the workpiece stack is elevated, i.e. a superatmospheric pressure. Because of the resulting high density of the inert gas and the more effective heat transfer from the inert gas to the metallic plates constituting the workpiece stack, the heating effect has been found to be especially uniform and can be effected at relatively low velocities of the gas. The low velocity of the inert gas is advantageous, as noted above, since it prevents, during melting of the solder, partial blowing thereof away from the contacting surfaces to be soldered together.

While this invention is applicable to the soldering together of two or more workpieces defining spaces between them, it has been found to be especially advantageous in the fabrication of heat exchangers with plate-like elements. In accordance with this aspect of the invention, the heating fluid is distributed through the passages defined between two adjacent heat-exchange elements to be joined by the soldering process. The distribution of the heating gas to these passages can be effected by elements, e.g. manifolds or heads, which need not sealingly engage the workpiece stack since some leakage of the heating fluid is not disadvantageous. In other words, the manifold or distributing head can simply be pressed against the stack, the plates of which may merely be clamped together.

It is advantageous to provide, at an intermediate region within the stack of plate-like element, one or more thermal elements, e.g. thermocouples, adapted to signal the temperature continuously, thereby controlling the temperature of the heating fluid or the attainment of the desired soldering temperature.

An apparatus for carrying out the process of the present invention can comprise a closeable soldering chamber which can be provided with a work table, temperature-monitoring means and a circulating path along which the heating fluid can be heated and, if desired, cooled. The circulation ducts can include means for connecting this path to the soldering chamber and to distributing of manifold devices therein for feeding the heating fluid to the stack and collecting the heating fluid from the stack.

For precise control of the heat supplied to the workpiece stack, it is advantageous to provide the heating path with both a cooling device and a heater, the path also comprising blower means and temperature- and pressure-monitoring devices.

The workpieces can be especially reliably soldered under defect-free conditions when means is provided for removing residual moisture from the chamber and from the workpieces prior to the attainment of the soldering temperature. To this end, the circulating path may comprise a drying station through which the inert gas is continuously fed or fed at least until the moisture content has been reduced to a predetermined maximum level. It has been found to be especially advantageous to provide the soldering chamber with evacuating means for drawing out the gases initially present therein and thereby removing possibly detrimental traces of moisture.

According to still another feature of the invention, also designed to eliminate traces of moisture which may be detrimental, the dry inert gas is passed through the passages of the workpiece stack and the interior of the soldering chamber as a sparging gas which is released into the atmosphere until the moisture content as determined by a moisture detector at the discharge side of the chamber, has been reduced to the predetermined maximum level.

It has also been found to be most advantageous to control the temperature of the workpiece during the total soldering process automatically by regulating the cooler and the heater from the temperature-monitoring devices by providing an electrical feedback connection between the monitoring device and the temperature-regulating means, namely, the cooler and the heater.

According to another aspect of the invention, which represents a departure from the method described in Ser. No. 778,460, the plate-like elements are superposed on a worktable to form a stack which is clamped to press the plates against one another.

Thereafter the assembled stack is introduced into the heating chamber and a heating fluid, preferably nitrogen, is passed directly through the internal passages of the stack and the interior spaces thereof, i.e. through the interior of the stack before entering the chamber. The fluid thus heats the stack to a temperature several degrees below the melting point of the solder.

When the temperature reaches this level the flow of the heating fluid is interrupted and the chamber is evacuated to a pressure of about $10^{-2}$ to $10^{-4}$ torr. At this nitrogen pressure the stack is heated within the chamber by radiant heating, e.g. from electrical heating rods or coils, as quickly as possible to a temperature above the melting point of the solder—say about 30° C. above the solder melting point. This permits the solder to flow. The stack is then cooled.

The advantage of this approach, which evacuates subsequent to heating by direct flow of hot gas (as opposed to evacuation in Ser. No. 778,460 exclusively for removing moisture from the chamber and the stack), is that it brings about a surprising uniformity of solder flow to all interstices between the plates and also is found to accelerate the soldering process.

BRIEF DESCRIPTION OF THE DRAWING

The above and other objects, features and advantages of the present invention will become more readily apparent from the following description, reference being made to the accompanying drawing, the sole FIGURE of which is a flow diagram illustrating an apparatus for carrying out the invention.

SPECIFIC DESCRIPTION

In the drawing I have shown an apparatus for carrying out the process of the present invention by way of the soldering of a stack of workpiece plates (adapted to form a plate heat exchanger) plates at their mutually contacting surfaces to define flow passages for a heat-exchange fluid between them. The plates are previously coated with solder in the conventional manner and may be composed of aluminum or an aluminum alloy.

The apparatus of the present invention comprises a soldering chamber 1 formed between a cylindrical housing 4 and a removable cover 5. The basic elements of the apparatus comprise the soldering chamber 1, a circulating path 2 for a heating fluid and connecting fittings 3 connecting the circulating path 2 with the soldering chamber 1.

The soldering chamber comprises the aforementioned thermally insulated receptacle 4 and the thermally insulated cover 5 which can be hermetically secured to the receptacle 4. The soldering chamber 1 is provided with a removable worktable 6 which can be shiftable into and out of the receptacle 4 on rails *4a* provided in the receptacle, the table 6 having rollers *6a* adapted to roll along these rails.

The circulating path 2 comprises an inlet or feedside 7 whereby the heating fluid is fed via lines 8 and distributing heads or manifolds 34 to the passages of the stack 32 of plates which are clamped together as represented at 33. The lines 8 and 9 feeding the distributing heads 34 are provided with valves 24 and 25 controlling the flow of fluid thereto.

The extension 10 of the return path 11 opens freely into the soldering chamber 1. A pressure-monitoring device 12 communicates with the chamber 1 to control the pressure therein, the monitoring device being connected, if desired, to a pressure-relief valve generally represented at 14 which can also serve to vent the chamber and which is, in turn, provided in a venting line 13. Should an excess of pressure develop within the chamber, the valve 14 opens to vent off the pressure excess.

In the return path 11 and the feed path 7 which form the circulation 2, there are provided in succession, a temperature-monitoring device 15, a valve 16 for controlling the proportion of recirculated fluid and discharged fluid, a blower or compressor 17, a pressure-monitoring device 18 at the discharge side of the compressor to control the latter if desired, a cooler 19 which may be supplied with a cooling fluid such as water via a valve 19*a*, a heater 20 which is electrically energized and a temperature-monitoring device 21.

Downstream of the heater 20 the feed line 7 is subdivided into a plurality of lines, two of which are shown at 22 and 23, respectively, corresponding in number to the distributing heads 34 and hence groups of flow passages provided in the workpiece stack 32.

Each of the lines 22, 23 has its flow cross section controllable via valves 24 and 25 so that the gas fed to the different passages of the stack 32 traverses the latter at the same flow rate.

Between the temperature-monitoring device 15 and the valve 16, a branch line 26 is provided for venting sparging gas into the atmosphere. The sparging-gas vent 26 is provided with a valve 27 whereby it may be blocked and, ahead of this valve 27, with a moisture detector 28. The latter can automatically control the valve 27 as represented by line 28*a* to close the valve 27 when the moisture content of the gas traversing line 26 has been reduced to the permissible maximum.

Ahead of the compressor 17, there opens into line 11 a further duct 29 which can be blocked by a valve 30 and into which is fed a dry inert gas. The valve 30 can be controlled by a pressure-monitoring device 31 responsive to the pressure in line 11.

The apparatus shown in the drawing has been found to be particularly effective for the soldering together of heat-exchange plates of aluminum or an aluminum alloy to produce a plate-type heat exchanger. The plates, as mentioned, being previously coated with the solder.

According to the invention, the solder-coated plate-like elements are assembled into the stack 32 and are clamped at 33 to the table 6 externally of the receptacle 4. The clamping means 33 can be provided with spring elements designed to increase the pressure with increasing temperature. The spring elements ensure that the stack will remain secure and tight during the soldering process.

The manifold heads of distributing elements 34 and 35, respectively at the upstream and downstream ends of the stack, are likewise pressed against the latter by clamping means of any conventional design, it being noted that a gas-tight seal is not required. The distributing heads and the ducts 8 and 9 can be made from a material which has a substantially higher melting point than that of the plate-like elements or the solder so that they are not, in turn, soldered to the stack. If the heat exchanger is to be provided with these distributing heads or manifolds, they are applied in a separate soldering operation.

The worktable 6 is preferably composed of stainless steel to which the solder does not adhere.

Thermal elements, e.g. thermocouples 36, can be distributed throughout this stack and are provided at least in the central region and edge zones thereof, the elements 36 collectively forming the temperature sensor of temperature-monitoring device respresented in the drawing. The temperature-sensing means 36 are connected with the temperature controller 21 which controls the valve 19*a* and the energization of the heater 20.

The chamber 1 is provided with a radiant heater 50 shown schematically and preferably consisting of one or more resistance-heating rods. The radiant heater 50 serves to rapidly raise the temperature of the stack to, say 30° C. above the melting point of the solder after heating-gas flow has been interrupted and the chamber evacuated. Naturally the heater 50 need not be provided over the length of the stack but can, in addition or alternatively, be provided at an end of the chamber or laterally of the stack.

The heater 50 is connected to the temperature controller 51 which responds to the sensors 36.

After the assembly 32 through 36 upon the table 6 is formed externally of the receptacle 4, the table 6 carrying same is rolled into the receptacle 4 and the cover 5 hermetically sealed thereto. The heating fluid, gaseous nitrogen or argon, generally in a pure and dry state, is then fed into the circulating path and the chamber 1. The heating fluid is circulated by the blower 17 and traverses the path 2. The heating fluid is continuously fed into the system through line 29, valve 16 being closed, with the fluid emerging from the chamber 1 being vented via line 26 and valve 27 until the moisture level as detected at 28 drops below the predetermined maximum, for example, 50 parts/million $H_2O$. The potentially detrimental moisture residue in the chamber and the stack can be removed. To this end the chamber can be provided with a suction line 40 a check valve 41 and a suction pump 42 which is effective prior to introduction of the nitrogen or other heating fluid into the system.

In addition, the circulating line 11 can be provided with a drying station 43, e.g. containing a molecular sieve, adapted to pass the nitrogen and trap the moisture. This prevents buildup of moisture in the chamber after the heating process has commenced.

After or even during the removal of moisture, the nitrogen is heated at 20 and supplied to the stack 32 via lines 22,23, 8, 9 and the distributing heads 34. The heated nitrogen, traversing the stack 32 and raising the temperature thereof, then passes into the interior of the chamber 1 via the manifolds 35 from which the nitrogen is drawn via outlet 10 and line 11 back along the heating path. The stack is rapidly heated to a temperature several degrees below the soldering temperature (melting point of the solder).

When the latter threshold (several degrees below the solder melting point) is reached, the gas flow is automatically cut off and the pump 17 evacuates the chamber 1 to $10^{-2}$ to $10^{-4}$ torr. At this pressure sensors 36 operate controller 51 to energize the heater 50 and bring the stack rapidly to some 30° C. above the solder melting point. The solder melts and the plates are bonded together.

The temperature-control device 15, 21 of the circulating path and thermoelements 36 on the stack ensure that the temperature of the heating fluid is sufficient to raise the temperature of the stack to the threshold several degrees below soldering temperature. Should the temperature rise above the permissible level, the temperature-monitoring device 21 operates the cooler 19 to rapidly reduce the temperature of the gas by dissipating the sensible heat of the recirculated gas and the compression heat of the compressor 17. Thus the stack 32 is maintained within the desired temperature limits during the direct gas-heating of the stack.

Because of the temperature increase, as long as nitrogen is not eliminated from the system, there is a gradual increase in pressure which can be increased still further by the supply of fresh nitrogen at an elevated pressure. The pressure increase is desirable in that it improves the heat transfer to the stack at low gas velocities, the gas velocity being selected to prevent blowing of solder away from the surfaces to be fused together.

As noted, it has been found to be advantageous to gradually heat the stack to a temperature just below the melting point of the solder and then suddenly to increase the temperature of the nitrogen, for example, by about 30° C. This causes the solder to melt within the stack over a brief interval preferably of two to thirty minutes to effect the fusion. During this period the temperature is carefully monitored and the temperature of rods 50 is controlled to maintain the fusion temperature.

When the solder has completely melted, the heater 20 is deenergized and nitrogen cooled by cooler 19 is circulated through the stack. The quantity of nitrogen is dependent upon the mass of the stack 32 and the heat losses of the apparatus. To this end, the soldering chamber and the ducts of the circulating path are prefereably insulated against the environment. While nitrogen is preferred as the inert gas, argon or other inert gases can also be used.

I claim:

1. A process for the soldering together of a stack of plates defining spaces between them to form a plate-type heat exchanger from the plates and wherein the spaces are formed as a plurality of passages of said heat exchanger running from one side of the stack to another side thereof generally along the plates, said method comprising the steps of:

holding said plates together in a sealed chamber with solder disposed at junctions between them;

passing a heating gas directly through said passages by distributing said gas thereto and thereby heating said plates, said heating gas being a gas inert with respect to the solder and said plates and being at a temperature below the melting point of said solder the heating gas traversing said passages before entering the chamber space around the held-together plates;

thereafter only discharging the heating gas into the chamber space around the held-together plates;

terminating the flow of gas through said passages;

heating said chamber to a temperature above the melting point of said solder thereby causing said solder to flow and bond said plates together; and cooling said plates.

2. The process defined in claim 1 wherein the pressure of said inert gas traversing said passages increases progressively during the heating of said plates by the inert gas.

3. The process defined in claim 1 wherein said inert gas is nitrogen.

4. The process defined in claim 1 wherein said plates are heated to said temperature above said melting point by subjecting said plates to radiant thermal energy in said chamber.

5. The process defined in claim 4 wherein said temperature above said melting point is about 30° C. above said melting point.

6. The process defined in claim 4, further comprising evacuating said chamber upon interruption of the flow of the heating gas and prior to radiant heating of said plates.

7. The process defined in claim 6 wherein the chamber is evacuated to about $10^{-2}$ to $10^{-4}$ torr.

8. The process defined in claim 7 wherein said inert gas is nitrogen and said temperature above said melting point is about 30° C. above said melting point.

9. The process defined in claim 2 wherein said plates are cooled by passing said inert gas through said passages.

* * * * *